(12) United States Patent
Copenhafer

(10) Patent No.: US 7,018,594 B2
(45) Date of Patent: Mar. 28, 2006

(54) CRYSTALLIZATION OF SODIUM CARBONATE DECAHYDRATE FROM LIQUORS SUPERSATURATED IN SODIUM BICARBONATE

(75) Inventor: William C. Copenhafer, Yardley, PA (US)

(73) Assignee: FMC Wyoming Corporation, Philadelphia, PA (US)

( * ) Notice: Subject to any disclaimer, the term of this patent is extended or adjusted under 35 U.S.C. 154(b) by 646 days.

(21) Appl. No.: 10/299,515

(22) Filed: Nov. 18, 2002

(65) Prior Publication Data

US 2003/0095912 A1   May 22, 2003

Related U.S. Application Data

(60) Provisional application No. 60/332,032, filed on Nov. 21, 2001.

(51) Int. Cl.
*C01D 7/00* (2006.01)
*C22B 26/10* (2006.01)

(52) U.S. Cl. .................. 423/206.2; 23/302 T
(58) Field of Classification Search ................ 423/184, 423/195, 198, 206.2, 421, 422, 427; 23/302 T
See application file for complete search history.

(56) References Cited

U.S. PATENT DOCUMENTS

| | | |
|---|---|---|
| 4,292,227 A | 9/1981 | Michaels et al. |
| 5,262,134 A | 11/1993 | Frint et al. |
| 5,283,054 A | 2/1994 | Copenhafer et al. |
| 5,609,838 A | 3/1997 | Neuman et al. |
| 5,618,504 A | 4/1997 | Delling et al. |
| 5,624,647 A | 4/1997 | Zolotoochin et al. |
| 5,955,043 A | 9/1999 | Neuman et al. |

*Primary Examiner*—Stanley S. Silverman
*Assistant Examiner*—Peter J Lish
(74) *Attorney, Agent, or Firm*—TraskBritt

(57) ABSTRACT

A process for recovering sodium carbonate decahydrate crystals from solutions and mother liquors supersaturated in sodium bicarbonate concentration. Feed liquors containing higher levels of sodium bicarbonate than traditionally fed to a sodium carbonate decahydrate crystallizer are used to create a mother liquor within a sodium carbonate decahydrate crystallizer that is supersaturated with respect to sodium bicarbonate. Substantially pure sodium carbonate decahydrate crystals may be precipitated from the supersaturated mother liquor without substantially precipitation of sodium bicarbonate containing crystals.

20 Claims, 3 Drawing Sheets

CRYSTALLIZATION OF SODIUM CARBONATE DECAHYDRATE FROM LIQUORS SUPERSATURATED IN SODIUM BICARBONATE

CROSS-REFERENCE TO RELATED APPLICATION

Pursuant to the provisions of 35 U.S.C. 119(e), this application claims the benefit of the filing date of U.S. provisional patent application Ser. No. 60/332,032, filed Nov. 21, 2001, for "CRYSTALLIZATION OF SODIUM CARBONATE DECAHYDRATE FROM LIQUORS SUPERSATURATED IN SODIUM BICARBONATE."

BACKGROUND OF THE INVENTION

1. Field of the Invention

The present invention relates to the formation of crystals from a supersaturated solution. More specifically, the present invention relates to the formation of substantially pure, or uncontaminated, sodium carbonate decahydrate crystals from solutions supersaturated in sodium bicarbonate and especially solutions obtained in the mining of trona or nahcolite ore deposits.

2. State of the Art

Sodium carbonate, otherwise known as soda ash, is used in the manufacture of glass, chemicals, soaps, detergents, aluminum, and other products. Traditionally, sodium carbonate is produced from trona ore deposits. Such ore deposits are primarily located in California, Utah, and Wyoming. More recently, sodium carbonate is also being produced from nahcolite deposits located primarily in Colorado. Both dry mining and solution mining techniques are used to obtain the necessary ore for sodium carbonate production processes. The methods used in the production of sodium carbonate are continuously evolving as cheaper, faster, and more efficient production methods and processes are discovered or developed.

One of the greatest concerns in soda ash production is the economics of the process. Attempts to decrease soda ash production costs have led to the development of a number of methods for providing a more economical process. The evolution of sodium carbonate production is well documented in U.S. Pat. No. 5,283,054 issued to Copenhafer et al., and U.S. Pat. No. 5,955,043 issued to Neuman et al., which are incorporated herein by reference.

Solution mining is a process for mining trona or nahcolite ore that is gaining popularity. As the readily accessible trona deposits are played-out and long-wall and room and pillar mining techniques become more expensive, solution mining plays a greater role in the production of sodium carbonate from trona ore. Similarly, solution mining of nahcolite ore has become a popular alternative for producing sodium carbonate. Solution mining typically involves the introduction of water, or a dilute solution containing sodium carbonate and possibly sodium bicarbonate, into an ore deposit. A bicarbonate-containing ore is dissolved by the solution creating a liquor containing both sodium carbonate and sodium bicarbonate. The liquor is pumped from a solution-mined ore deposit to a surface plant where it is processed into soda ash or sodium bicarbonate.

Liquors produced by dry mining and solution mining processes typically contain sodium bicarbonate and sodium carbonate, as well as smaller amounts of impurities such as sodium chloride, sodium sulfate, and organics. The presence of sodium bicarbonate concentrations in a liquor may lead to the co-precipitation of unwanted products during crystallization of the liquor. For example, unwanted sodium bicarbonate crystals or sodium sesquicarbonate crystals may co-precipitate with sodium carbonate-containing crystals such as sodium carbonate monohydrate or sodium carbonate decahydrate. It is known, however, that co-precipitation of unwanted crystals may be reduced or eliminated by reducing the sodium bicarbonate concentration of a liquor. One of the challenges facing the soda ash production industry is how to economically reduce the sodium bicarbonate concentration of a liquor such that the sodium bicarbonate concentration will not interfere with the crystallization of substantially pure sodium carbonate-containing crystals.

A number of methods for reducing the sodium bicarbonate concentrations of liquors used in soda ash production processes have been proposed. Typically, the treatments focus upon the conversion of sodium bicarbonate concentrations in the liquor to sodium carbonate concentrations. For example, sodium bicarbonate concentrations may be reduced by adding sodium hydroxide to a liquor that has been evaporated as disclosed by Copenhafer et al. in U.S. Pat. No. 5,283,054. Alternatively, liquor may be subjected to steam stripping to strip $CO_2$ from the liquor and convert sodium bicarbonate to sodium carbonate, as disclosed by Copenhafer et al., U.S. Pat. No. 5,283,054, and by Neuman et al., U.S. Pat. No. 5,955,043.

Heretofore, pre-crystallization treatment of sodium bicarbonate concentrations in liquors served to drive the sodium bicarbonate concentration of the liquor to just at, or below, the sodium bicarbonate equilibrium point of the system. By doing so, the precipitation of sodium bicarbonate or sodium sesquicarbonate crystals during sodium carbonate monohydrate or sodium carbonate decahydrate crystallization can be avoided. For example, FIG. 1 illustrates a phase diagram for a sodium carbonate, sodium bicarbonate, and water system at different temperatures. The solid line connecting points C-D-E-F-G-C defines Region A which represents the region where sodium bicarbonate-containing salts, such as sodium bicarbonate and sodium sesquicarbonate, are not at the equilibrium solid phase at any temperature. Line C–D represents the phase boundary of saturated solutions in equilibrium with sodium carbonate decahydrate and sodium bicarbonate. Line D–E is the phase boundary for saturated solutions in equilibrium with sodium carbonate decahydrate and sodium sesquicarbonate. Liquors used to crystallize sodium carbonate decahydrate are generally treated prior to crystallization to bring the sodium bicarbonate and sodium carbonate concentrations of the liquor within Region A. The broken lines represent liquor compositions that are saturated at the indicated temperatures. Saturated liquor compositions in Region B are normally in equilibrium with sodium bicarbonate, sodium sesquicarbonate, or sodium carbonate monohydrate, at the appropriate temperatures.

The long-standing technical approach towards producing pure decahydrate crystals of sodium carbonate has been to operate well under the equilibrium line to avoid co-crystallization of unwanted species. This has been obtained by treating feed liquors to reduce sodium bicarbonate concentrations therein. Although it has been reported that sodium sulfate has been crystallized under non-equilibrium conditions in 1951, the soda ash industry has not viewed that situation as instructive for soda ash production. See, Hightower, *Chemical Engineering*, August 1951, p. 104.

Treatment of decahydrate crystallizer feed liquor to reduce the bicarbonate concentration is disadvantageous, however, because the treatment steps are usually expensive and additional process equipment must be added to the overall production process. Therefore, a method for recovering substantially pure, or uncontaminated, sodium carbonate decahydrate, from a liquor having concentrations of both sodium bicarbonate and sodium carbonate is desirable. A method wherein liquor pre-crystallization steps, such as additional caustic or dilution, as well as $CO_2$ stripping, could be reduced or eliminated from the soda ash production process would also be desirable. Furthermore, increasing the amount of carbonate decahydrate recovered from a crystallizer feed liquor, without resorting to additional pretreatment steps to reduce the bicarbonate concentration prior to crystallization, would be of great economic value.

SUMMARY OF THE INVENTION

The present invention relates to the formation of sodium carbonate decahydrate crystals from solutions having concentrations of sodium carbonate and sodium bicarbonate, and especially with respect to solutions obtained in the mining of trona or nahcolite ore deposits, in which the sodium bicarbonate is intentionally supersaturated in the mother liquor during crystallization of sodium carbonate decahydrate crystals.

Heretofore the art taught that precipitation of pure sodium carbonate decahydrate crystals (i.e. crystals substantially uncontaminated with sodium bicarbonate crystals) could only be obtained from a solution (i.e. mother liquor) having sodium bicarbonate concentrations below its equilibrium saturation concentration. Existing phase diagrams and traditional crystallization chemical processing knowledge instructed that above such equilibrium saturation concentrations sodium bicarbonate would co-crystallize with sodium carbonate decahydrate. However, it has been quite unexpectedly discovered that substantially pure, i.e. uncontaminated, sodium carbonate decahydrate crystals may be precipitated without substantial sodium bicarbonate crystal contamination from solutions supersaturated in sodium bicarbonate. In other words, contrary to the teachings of the prior art, substantially pure sodium carbonate decahydrate crystals may be precipitated from solutions in which the sodium bicarbonate concentration is above its equilibrium saturation concentration. Perhaps even more surprising, it has been discovered that the effect is reversible.

When a continuous carbonate decahydrate crystallization process is operating in supersaturated fashion under steady state conditions, and the process flow rates are either slowed down or stopped entirely to idle the system, the previously supersaturated concentration of sodium bicarbonate may result in the precipitation of sodium bicarbonate from the mother liquor. However, upon restarting the process, the mother liquor will cleanse itself of precipitated sodium bicarbonate, and again return to operation under conditions of supersaturated bicarbonate concentrations. Thus, as long as the crystallization process is maintained in a dynamic state, i.e. operation in a continuous fashion under steady state conditions, sodium carbonate decahydrate may be crystallized from mother liquors containing supersaturated levels of sodium bicarbonate without the co-crystallization of significant quantities of sodium bicarbonate. The reversibility of resolubilizing to a supersaturated condition with respect to sodium bicarbonate is important from a production plant standpoint inasmuch as operations may be continuously conducted with assurance that a shut down for maintenance, or any other reason, will not require dumping the crystallizer mother liquor and precipitated crystals.

The crystallization process may be conducted under conditions of sodium bicarbonate supersaturation such that virtually no sodium bicarbonate is precipitated with sodium carbonate decahydrate, or under conditions where some sodium bicarbonate precipitates consistent with the quality of sodium carbonate decahydrate desired. Accepting some bicarbonate precipitation consistent with quality objectives may improve throughput, other desirable operating conditions, and ultimately, the economics of a process. The quantity of co-crystallization of sodium bicarbonate with sodium carbonate decahydrate may be limited by the filterability of the crystalline mass.

Cooling of a sodium carbonate solution supersaturated in sodium bicarbonate within an active crystallization process may be conducted to crystallize sodium carbonate decahydrate in the substantial absence of sodium bicarbonate crystals. Surprisingly, it has been determined that, under continuous steady state operating conditions, sodium bicarbonate tends to remain in a supersaturated state allowing the crystallization of substantially pure sodium carbonate decahydrate from liquor compositions having sodium bicarbonate concentrations above the decahydrate—bicarbonate phase boundary. Depending upon how high the initial sodium bicarbonate concentration is in the decahydrate crystallizer feed, pre-crystallization treatment methods can either be minimized or eliminated. Likewise, depending upon the initial bicarbonate concentration, it has been found that sodium sesquicarbonate does not precipitate with sodium carbonate decahydrate in a crystallization process in which the mother liquor concentration of sodium bicarbonate is supersaturated and is above the decahydrate-sesquicarbonate phase boundary. The residence time of a mother liquor in the sodium carbonate decahydrate crystallizer is generally limited to an amount of time required to crystallize sodium carbonate decahydrate crystals in the substantial absence of precipitated sodium bicarbonate, consistent with obtaining good yields of sodium carbonate decahydrate crystals.

The present invention relies upon the discovery that sodium bicarbonate tends to remain supersaturated in the mother liquor while crystallizing sodium carbonate decahydrate under steady state dynamic conditions with controlled residence times for the mother liquor. The general process involves the introduction of a feed solution containing sodium carbonate and sodium bicarbonate directly to a sodium carbonate decahydrate crystallizer. Cooling of the solution to obtain crystallization of sodium carbonate decahydrate crystals and supersaturation of the mother liquor with respect to sodium bicarbonate may be accomplished by any of several methods commonly known to those skilled in the art. Usually, sodium carbonate decahydrate may be crystallized by evaporating water from a mother liquor under vacuum, or by circulating a crystal slurry through heat exchangers. Cooling crystallization may also be effected via direct contact with a gas that expands within the crystallizer body to remove heat. A crystallizer feed solution may be any solution formed by solution mining or dry mining of trona, nahcolite, or other sodium bicarbonate containing ores. A sodium carbonate decahydrate crystallizer feed may also originate directly from a solution mine well field, or from a liquor obtained from a sodium carbonate monohydrate crystallizer or other source. Avoiding the use of pretreatment methods that involve elevated temperatures has the further advantage of eliminating, or at least reducing, eitelite scaling, which is a common problem in typical soda ash production processes.

DESCRIPTION OF THE DRAWINGS

While the specification concludes with claims particularly pointing out and distinctly claiming that which is regarded as the present invention, the present invention can be more readily ascertained from the following description of the invention when read in conjunction with the accompanying drawings in which:

DETAILED DESCRIPTION OF THE INVENTION

The instant invention, in a preferred embodiment, is directed particularly towards the crystallization of substantially pure, or uncontaminated, sodium carbonate decahydrate crystals from solutions containing sodium carbonate and sodium bicarbonate, wherein the sodium bicarbonate is supersaturated in the crystallizer mother liquor. The present invention achieves the crystallization of sodium carbonate decahydrate from liquors having sodium bicarbonate concentrations above those concentrations that theoretically result in the co-crystallization of sodium bicarbonate, or sodium sesquicarbonate, with sodium carbonate decahydrate crystals at equilibrium.

For the purposes of the present invention, the term "pure" when referred to in reference to substantially pure sodium carbonate decahydrate crystals, includes and means sodium carbonate crystals that are substantially free of sodium bicarbonate type crystals, including sodium bicarbonate and/or sodium sesquicarbonate crystals.

Figure 1:
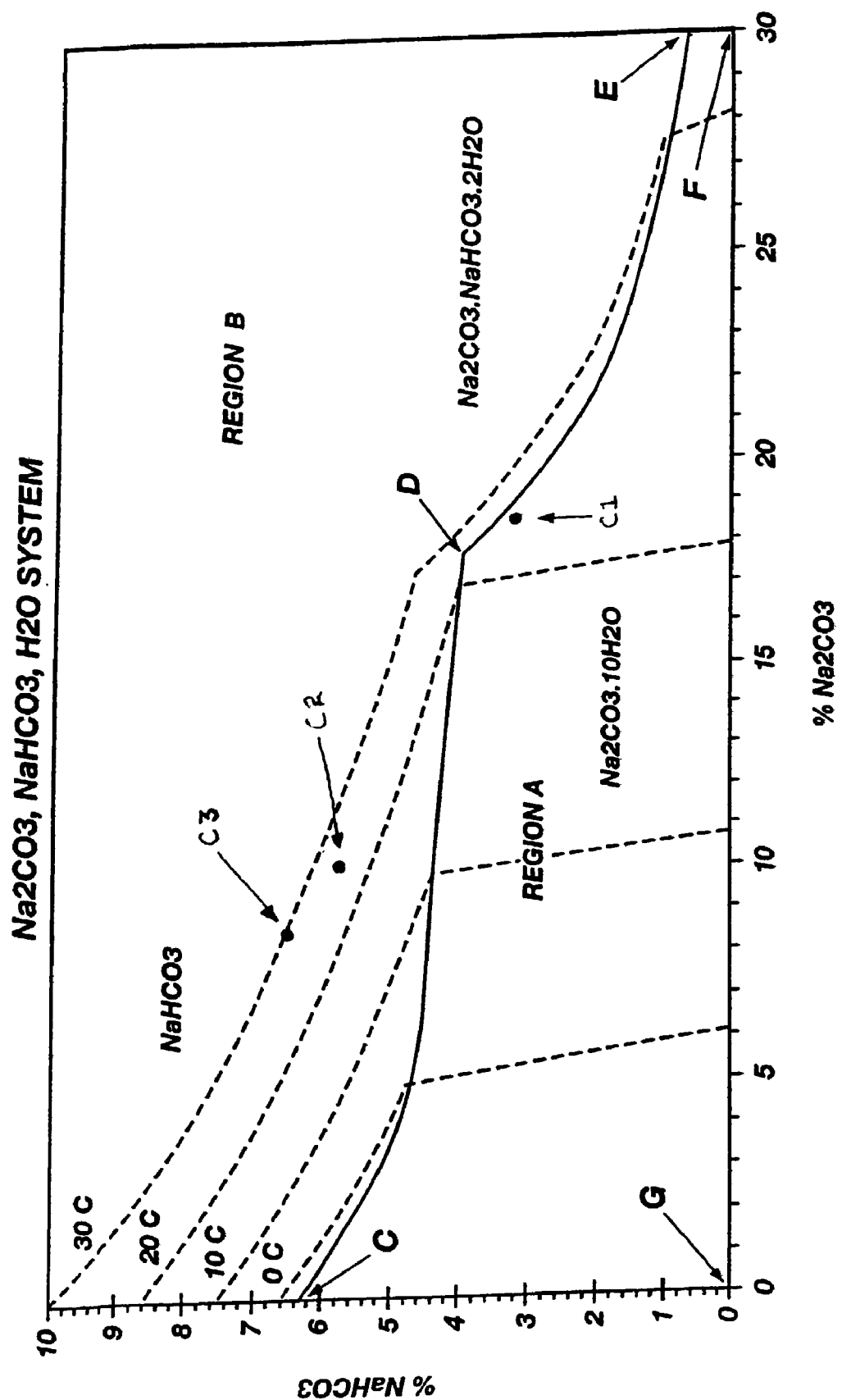
FIG. 1 illustrates a phase diagram for a sodium carbonate, sodium bicarbonate, and water system. Broken lines indicate solubility limits for various species at several temperatures. Region A, defined by solid line C-D-E-F-G-C, represents the region in which sodium carbonate decahydrate is in equilibrium with a solution or liquor.

A representative phase diagram for a sodium carbonate, sodium bicarbonate, and water system is illustrated in FIG. 1. The region below the solid line connecting points C-D-E-F-G-C represents Region A, wherein sodium carbonate decahydrate is expected to precipitate from solution, at any temperature, without significant precipitation of sodium bicarbonate crystalline products. It is known that within Region A, sodium bicarbonate will not precipitate from a solution having such concentrations. Therefore, sodium carbonate decahydrate crystallizers are intentionally operated within Region A to ensure the precipitation of sodium carbonate decahydrate without sodium bicarbonate contamination.

The broken lines of FIG. 1 represent solubility limits for liquor compositions at various temperatures. At a specific temperature, liquors having compositions falling below, or to the left of, the solubility limits are under-saturated with respect to sodium bicarbonate, whereas liquors having compositions above, or to the right of, the solubility limits are supersaturated with respect to sodium bicarbonate. It was previously thought that liquors introduced to sodium carbonate decahydrate crystallizers operating at specific temperatures would only produce sodium carbonate decahydrate crystals substantially free of sodium bicarbonate if the sodium bicarbonate concentrations of the liquor were at or below their equilibrium solubility limits as determined from scientifically accepted equilibrium charts for the operating temperature of the crystallizer.

The present invention, however, provides methods for precipitating relatively pure sodium carbonate decahydrate crystals from liquors falling outside of Region A, or above the phase boundary indicated in FIG. 1 as line C-D-E. Specifically, using the methods of the present invention, substantially pure sodium carbonate decahydrate crystals may be precipitated from liquors having sodium bicarbonate concentrations outside Region A of FIG. 1 without the formation of significant amounts of sodium bicarbonate or sodium sesquicarbonate crystals. Thus, substantially pure sodium carbonate decahydrate crystals may be produced from crystallizer mother liquors supersaturated in sodium bicarbonate.

The amount of sodium bicarbonate supersaturation in a crystallizer mother liquor may be expressed, or measured, by the degrees of supersaturation. For the purposes of the present invention, the degrees of supersaturation correspond to the difference between the expected equilibrium saturation temperature and the actual operating temperature of a sodium carbonate decahydrate crystallizer. The phase diagram of FIG. 1 can be used to calculate the degrees of supersaturation in a sodium carbonate decahydrate crystallizer. For instance, a sodium carbonate decahydrate crystallizer operating at about 0° C., with a mother liquor composition of about 5 percent sodium carbonate and about 6.8 percent sodium bicarbonate, operates at about 20 degrees of supersaturation. The given crystallizer mother liquor concentrations correspond to an equilibrium solubility limit of 20° C. However, using the present invention, the crystallizer may be operated at 0° C. Thus, the crystallizer mother liquor is supersaturated in sodium bicarbonate. The difference between the expected solubility limit temperature, in this case 20° C., and the actual crystallizer operating temperature, 0° C., represents the degrees of supersaturation for the system. In this case, the crystallizer is operating at 20 degrees of supersaturation.

The method previously described for calculating the degrees of supersaturation is based upon the Celsius temperature scale. Other temperature scales may also be used. For example, the Fahrenheit temperatures corresponding to 0° C. and 20° C., as in the previous example, are 32° F. and 68° F., respectively. Therefore, the degree of supersaturation for the given example, with respect to Fahrenheit temperatures, is 36 degrees of supersaturation. Although other temperature scales may be used, the term "degrees of supersaturation" for the purposes of this description of the invention means and includes degrees of supersaturation based upon a Celsius temperature scale. A person of skill in the art could readily determine the degrees of supersaturation in degrees Celsius for other temperature systems using the appropriate temperature conversions.

Figure 2:
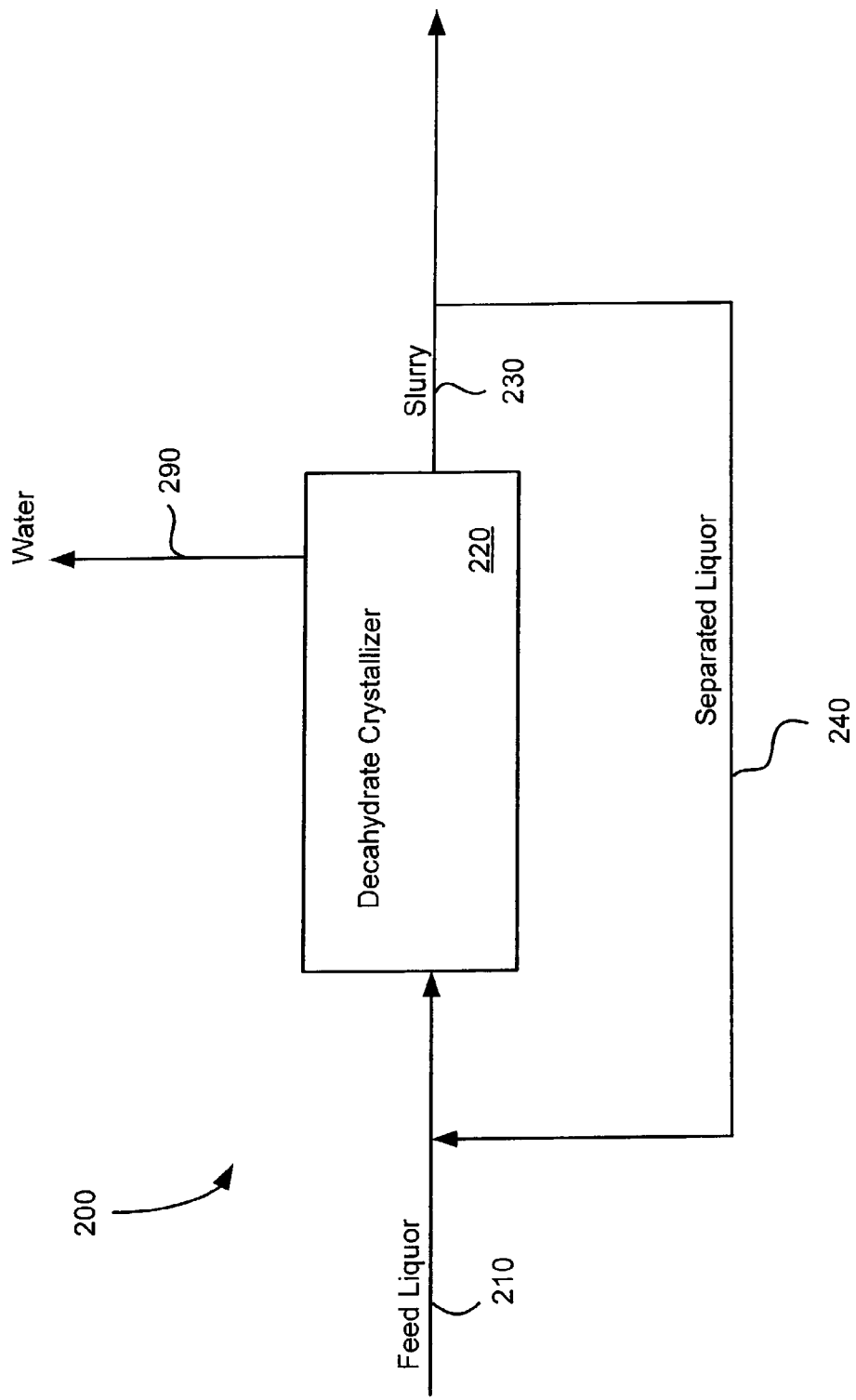
FIG. 2 illustrates a representative portion of a sodium carbonate decahydrate crystallization process as may be used with the present invention.

In one embodiment of the present invention, a sodium carbonate decahydrate crystallizer, operating in a supersaturated state with respect to sodium bicarbonate, crystallizes substantially pure sodium carbonate decahydrate crystals from a feed liquor containing sodium carbonate and sodium bicarbonate. A simple diagram of the process 200 components is illustrated in FIG. 2. Feed liquor 210 is introduced to a sodium carbonate decahydrate crystallizer 220. Slurry 230, comprising substantially pure sodium carbonate decahydrate crystals and a liquor, containing both dissolved sodium carbonate and sodium bicarbonate, exits the sodium carbonate decahydrate crystallizer 220. The sodium carbonate decahydrate crystals may be separated from the liquor in slurry 230 by methods known in the art, such as centrifugation, hydrocyclone separation, and the like. Separated liquor 240 may be recycled and combined with the feed liquor 210. Although sodium carbonate decahydrate crystallizer 220 may be any sodium carbonate decahydrate crystallizer 220 as known in the art, process 200 is shown with a cooling crystallizer with water stream 290.

Feed liquor 210 may be any liquor containing sodium carbonate and sodium bicarbonate. For example, feed liquor 210 may include liquors formed from solution mining trona or nahcolite ore deposits, liquors formed in part from the dissolution of dry mined ore, or liquors purged from a sodium carbonate monohydrate crystallization process. Furthermore, feed liquor 210 may be treated to decrease sodium bicarbonate concentrations in the feed liquor 210, such as by stripping $CO_2$ from feed liquor 210, or by adding caustic, water, or other dilution streams to feed liquor 210.

The sodium carbonate decahydrate crystallizer 220 may be any type of cooling crystallizer known in the art. Operation of the sodium carbonate decahydrate crystallizer 220, however, is not limited to saturated or undersaturated sodium bicarbonate conditions. Instead, the sodium carbonate decahydrate crystallizer 220 may be operated at a specific temperature where sodium bicarbonate concentrations in the crystallizer mother liquor are supersaturated. Surprisingly, the operation of the sodium carbonate decahydrate crystallizer 220 with mother liquors supersaturated in sodium bicarbonate produces substantially pure sodium carbonate decahydrate crystals without the precipitation of unwanted sodium bicarbonate and sodium sesquicarbonate.

Evaporative cooling of a crystallizer under strong vacuum conditions is economically effective down to about 12° C. To attain lower temperatures, contact cooling of the crystallizer with a refrigerated liquid to attain crystallizer mother liquor temperatures of less than 12° C., such as desirable operating temperatures of about 5° C. and below.

Figure 3:
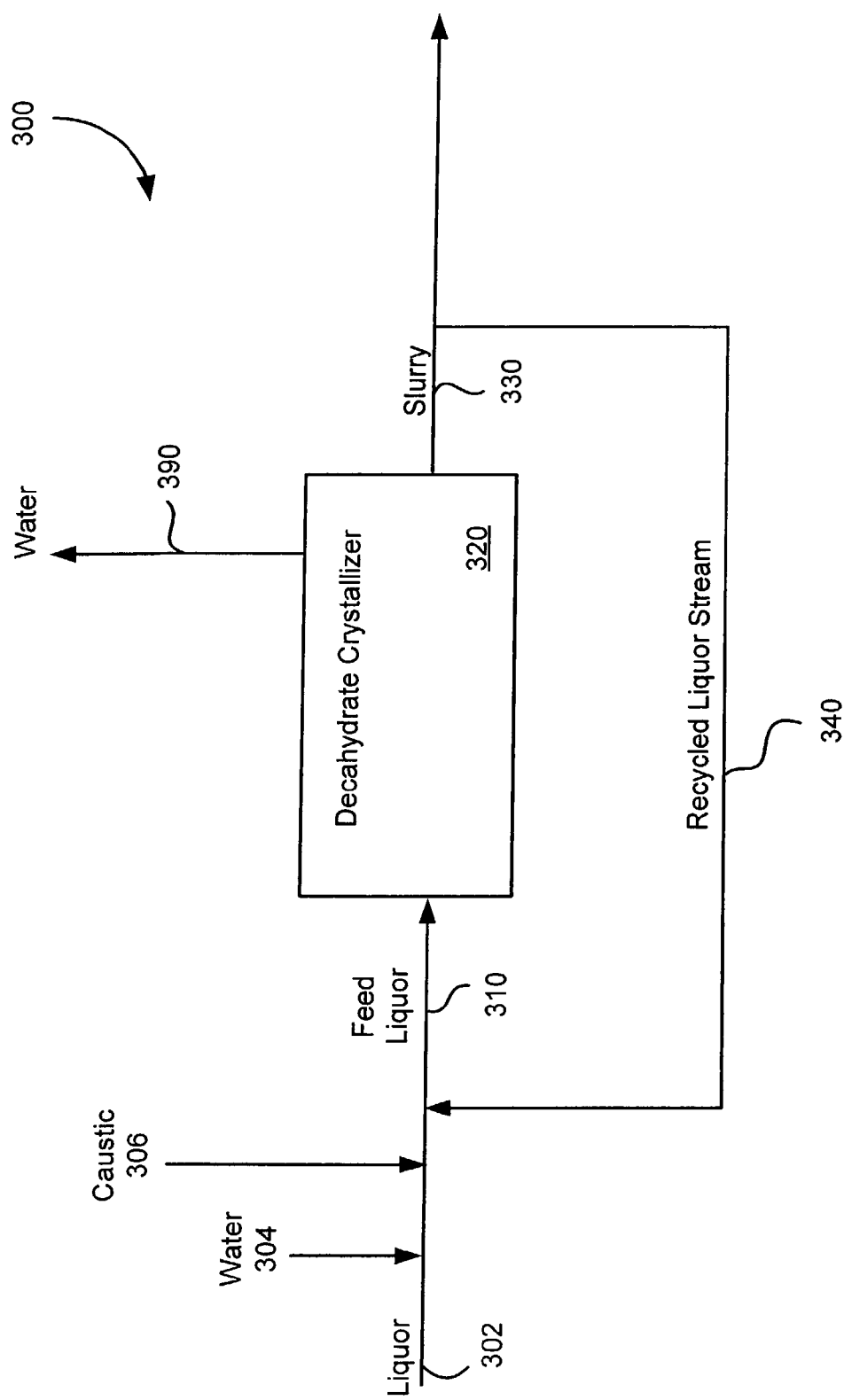
FIG. 3 illustrates a block diagram of a sodium carbonate decahydrate crystallization process.

The advantages of operating a sodium carbonate decahydrate crystallizer with mother liquor supersaturated in sodium bicarbonate are more readily apparent from a comparison of the prior art processes with those of the present invention. FIG. 3 illustrates a typical sodium carbonate decahydrate crystallization process. Several examples of sodium carbonate decahydrate crystallization using process 300 further illustrate the advantages of the present invention.

Process 300 operates in much the same way as process 200. The concentration of sodium bicarbonate in originating liquor 302 may be high enough that some reduction in its concentration may be necessary to allow a sustainable degree of sodium bicarbonate supersaturation. The sodium bicarbonate content of originating liquor 302 may be reduced by diluting originating liquor 302 with water or aqueous alkaline streams, stripping $CO_2$ from the solution, or neutralizing the solution with lime or caustic. The examples detailed herein use a combination of water dilution, stream 304, with the addition of caustic, stream 306, to form crystallizer feed liquor 310. Feed liquor 310 is fed to a sodium carbonate decahydrate crystallizer 320 where slurry 330 is formed. Slurry 330 comprises sodium carbonate decahydrate crystals and mother liquor containing sodium carbonate and sodium bicarbonate. Slurry 330 and evaporated water 390 exit the sodium carbonate decahydrate crystallizer 320. A recycle liquor stream 340 separated from slurry 330 may be recycled and combined with feed stream 310 to assist in controlling the solids density in the crystallizer.

Traditionally, sodium carbonate decahydrate crystallizers 320 were operated with feed liquors 310 that produce mother liquors within sodium carbonate decahydrate crystallizers 320 that are saturated or undersaturated in sodium bicarbonate. For example, purge liquor from a sodium carbonate monohydrate crystallization process may be fed to a sodium carbonate decahydrate crystallizer 320 after being treated to reduce the sodium bicarbonate concentration of sodium carbonate monohydrate purge liquor. The following example illustrates a material balance and the total alkalinity (TA) yields of a sodium carbonate decahydrate crystallization process 300 operating with a mother liquor undersaturated in sodium bicarbonate, as taught by the prior art. The remaining two examples detail the processes of the present invention and the improved crystallizer yield obtained by using the processes of the present invention.

In each of the examples, TA refers to "total alkalinity" and is the sum of the sodium carbonate and sodium bicarbonate values, or concentrations, expressed on a carbonate basis as follows:

$$TA = Na_2CO_3 + 0.631 (NaHCO_3)$$

where $Na_2CO_3$ is sodium carbonate and $NaHCO_3$ is sodium bicarbonate.

In each of the examples, the originating liquor 302 is monohydrate purge liquor having a flow rate of 100 gallons per minute (gpm). The monohydrate purge liquor comprises 29 percent sodium carbonate and 3.5 percent sodium bicarbonate, for a TA of 31.21 percent. Based upon this composition, the originating liquor 302 is fed to process 300 at 63,713 pounds per hour (lbs/hr), or 19,884 lbs/hr TA. Although the examples are based on a monohydrate purge liquor absent impurities, such as sodium chloride and sodium sulfate, it is understood that such impurities may exist in the process. Additionally, it is assumed for all of the examples that feed stream 310 have a temperature of 65.6° C. Also, caustic stream 306 comprises 1.75 percent sodium carbonate and 10 percent sodium hydroxide.

The first case illustrates the limitations of operating a decahydrate crystallizer in which the mother liquor sodium bicarbonate concentration is purposefully maintained within Region A of the phase diagram. The originating liquor 302 may be liquor purged from a sodium carbonate monohydrate crystallizer. Its composition, 29.0 percent sodium carbonate and 3.5 percent sodium bicarbonate, contains so much sodium bicarbonate that some pretreatment is necessary to allow the evaporatively cooled decahydrate crystallizer to operate within the normal equilibrium Region A of the phase diagram, as desired by prior art processes. The addition of 12 gallons per minute (gpm), or 6,000 lbs/hr, of water, stream 304, and 6,700 lbs/hr of caustic, stream 306, to originating liquor 302, yields crystallizer feed liquor 310, containing 26.66 percent sodium carbonate and 1.08 percent sodium bicarbonate, or 20,889 lbs/hr of TA. Recycle liquor stream 340, comprising liquor removed from slurry 330, is also combined with feed stream 310 at a rate of 55,717 lbs/hr to maintain the crystal solids density at about 35 percent. Evaporative cooling in the sodium carbonate decahydrate crystallizer 320 may be achieved by adjusting the pressure within the sodium carbonate decahydrate crystallizer 320 such that the crystallizer operation temperature is about 21.1° C. At this temperature, the mother liquor reaches a steady state composition of 18.19 percent sodium carbonate and 3.39 percent sodium bicarbonate. This composition is illustrated as point C1 of the phase diagram in FIG. 1. When operating the crystallizer at this temperature, the mother liquor composition falls within Region A and is in equilibrium with sodium carbonate decahydrate.

Slurry 330 is removed from sodium carbonate decahydrate crystallizer 320. After separating a portion of recycle mother liquor 340 from slurry 330, the product contains 43,059 lbs/hr sodium carbonate decahydrate crystals, or 15,959 lbs/hr TA. A net 24,250 lbs/hr of mother liquor, containing 4,930 lb/hr of TA, must be purged or discarded from the system to a waste stream. Thus, the total percentage of TA recovered in sodium carbonate decahydrate crystals for this first case is 76.4 percent. The operation of sodium carbonate decahydrate crystallizer 320 using the methods of this first case limits production of sodium carbonate crystals because the sodium carbonate decahydrate crystallizer 320 must operate with a sodium bicarbonate concentration which is not supersaturated, i.e. the mother liquor composition must remain below line C-D-E.

The material balances for the first example, and for the two additional cases illustrating the benefits of operating under conditions of bicarbonate supersaturation using the processes of the present invention, are shown in Table I.

In case two, water, stream 304, and caustic, stream 306, have the same flow rates and concentrations as case one. However, crystallizer 320 is operated at 10° C., rather than 21.1° C., in order to crystallize more TA as sodium carbonate decahydrate. Since the system is allowed to operate under higher supersaturated bicarbonate concentrations, the amount of water in evaporated water stream 390 increases to 11,127 lbs/hr, and the amount of sodium carbonate decahydrate crystals increases to 51,125 lbs/hr in stream 330. The flowrate of mother liquor recycle stream 340 (separated from slurry 330, such as by using a cyclone, not shown) must be increased to 80,785 lbs/hr to maintain a solids density at 35% due to the increased amount of sodium carbonate decahydrate crystallized. After accounting for this recycled mother liquor, a net 14,161 lbs of liquor containing 1,940 lbs/hr of TA is purged. The TA yield in the sodium carbonate decahydrate crystals equates to 18,948 lbs/hr,

TABLE I

Example Process Parameters

| Case Number | Crystallizer Temperature (° C.) | Mother Liquor Composition % Na2CO3 | Mother Liquor Composition % NaHCO3 | Mother Liquor Saturation Temp (° C.) | Degrees of Supersaturation (° C.) | Lbs/hr Decahydrate Crystals | Process % Yield |
|---|---|---|---|---|---|---|---|
| 1 | 21.1 | 18.2 | 3.4 | 21.1 | 0 | 43,059 | 76 |
| 2 | 10.0 | 10.0 | 5.8 | 25.0 | 15 | 51,125 | 91 |
| 3 | 5.0 | 8.4 | 6.6 | 30.0 | 25 | 52,140 | 93 |

Based upon prior art methods, additional water, dilute alkali solution, or caustic could be added, or carbon dioxide could be stripped, from a crystallizer feed in order to increase the carbonate decahydrate crystal yield in the crystallizer. This could be accomplished either at the same temperature by using a warmer crystallizer feed, or by lowering the crystallizer operating temperature when using a crystallizer feed at a fixed temperature. Either way, the sodium bicarbonate concentration of mother liquor in prior art processes is not allowed to rise above those concentrations where the mother liquor remains sub-saturated in sodium bicarbonate. In other words, the mother liquor composition would have to remain in Region A of FIG. 1. Utilizing the present invention, however, the sodium carbonate decahydrate crystallizer 320 may be operated with a mother liquor concentration supersaturated in sodium bicarbonate. The present invention results in a process that provides a greater yield of substantially pure sodium carbonate decahydrate crystals without the additional process steps or additional reagents once thought necessary to produce acceptably high yields of sodium carbonate decahydrate crystals. In addition, the sodium carbonate decahydrate crystals are produced without substantial sodium bicarbonate and sodium sesquicarbonate precipitation even though the sodium bicarbonate mother liquor concentrations are supersaturated.

Operating sodium carbonate decahydrate crystallizer 320 with a mother liquor supersaturated in sodium bicarbonate, as proposed by the present invention, yields improved sodium carbonate decahydrate crystal production. This is illustrated by cases two and three based on the process 300 of FIG. 3. In both examples, the flow rate and composition of originating liquor 302 is the same as that for case one.

resulting in a 90.7 percent TA recovery for process 300 operating under the conditions proposed by the present invention.

The composition of sodium carbonate decahydrate crystallizer 320 mother liquor in case two is represented by point C2 on the phase diagram of FIG. 1. As illustrated, the sodium bicarbonate concentration of the mother liquor in sodium carbonate decahydrate crystallizer 320 is well above the 10° C. solubility isotherm, and has a saturation temperature of about 25° C. Thus, the system is operating under steady state conditions with about 15° C. of supersaturation because the crystallizer mother liquor temperature is actually 10° C. However, crystallizer 320 produces a substantially pure sodium carbonate decahydrate crystal product without the presence of sodium bicarbonate or sodium sesquicarbonate crystals. This is contrary to the teachings of the prior art and contrary to what would be expected by those who understand the phase diagram of FIG. 1. The mother liquor composition of C2 would be expected to be in equilibrium with sodium bicarbonate, not sodium carbonate decahydrate. As long as process 300 continues to operate in a steady state fashion with a mother liquor supersaturated in sodium bicarbonate, the state of bicarbonate supersaturation can be maintained, resulting in improved sodium carbonate decahydrate crystal yield without resorting to the use of more caustic, or other sodium bicarbonate reduction methods, to further reduce the bicarbonate in the cooling crystallizer feed liquor.

In case three, the identical flow rates and concentrations of case two for originating stream 302, water, stream 304, and caustic, stream 306, are used. Sodium carbonate decahydrate crystallizer 320 is operated at 5° C., which results in a higher level of supersaturation in the sodium carbonate decahydrate crystallizer 320. The increased supersaturation of sodium bicarbonate increases the yield of sodium carbonate decahydrate crystals even further. Evaporated water stream 390 increases to 11,791 lbs/hr in case three, and with the increased precipitation of sodium carbonate decahydrate to 52,140 lbs/hr, the mother liquor sodium bicarbonate concentration increases to 6.6 percent sodium bicarbonate. To maintain the crystallizer solids at 35 percent, the flowrate of recycle stream 340 increases to 84,351 lbs/hr. The total percent of TA recovered in case three is 92.5 percent. Furthermore, the amount of mother liquor purged from the system is only 12,481 lbs/hr, containing 1,564 lbs/hr of TA. Compared to the 24,450 lbs/hr of purged liquor in case one, a 48 percent reduction in the amount of mother liquor sent to waste is realized utilizing the methods of the present invention.

Point C3 represents the mother liquor composition in the sodium carbonate decahydrate crystallizer 320 for case three. Since the crystallizer mother liquor temperature is actually 5° C., but its saturation temperature corresponds to 30° C. on the phase diagram of FIG. 1, the system is operating with 25 degrees of supersaturation. Yet, the sodium carbonate decahydrate crystallizer 320 produces a substantially pure sodium carbonate decahydrate crystal product without the formation of sodium bicarbonate or sodium sesquicarbonate crystals. This is again contrary to what would be expected by those who understand the phase diagram of FIG. 1, and contrary to the teachings of the prior art.

Using the methods and processes of the present invention, a sodium carbonate decahydrate crystallizer may be operated with a mother liquor supersaturated in sodium bicarbonate and produce a substantially pure sodium carbonate decahydrate crystal product. A larger yield of sodium carbonate decahydrate crystals may be realized over prior art processes, with a decreased amount of required sodium bicarbonate reduction required for the sodium carbonate decahydrate crystallizer feed stream. Thus, the present invention, namely operating a sodium carbonate decahydrate crystallizer with a supersaturated sodium bicarbonate mother liquor, results in cost savings and production increases over prior art processes.

Utilizing the processes of the present invention, the residence time of the mother liquor is generally maintained for a period of less than about three hours. Residence times of less than two hours are preferred, with best results attained at residence times of less than one hour, although residence times may vary for different process conditions, feed compositions and the like.

In another embodiment, the process of the instant invention may be conducted whereby the level of supersaturation of sodium bicarbonate in the decahydrate crystallizer may be maintained such that a controlled amount of co-crystallization of sodium bicarbonate crystals may be produced without creating an unfilterable crystal mass. In other words, a small amount of sodium bicarbonate crystal production may be tolerated with the production of sodium carbonate decahydrate.

For instance, the filter cake of a crystallized sodium carbonate decahydrate product may include a bicarbonate crystal content of about 3 percent by weight on a wet cake basis, without adversely affecting the filterability of the recovered crystal product. In many instances, processing a decahydrate product containing limited amounts of sodium carbonate bicarbonate crystals into an acceptable soda ash product can be achieved by conventional procedures. Accepting some bicarbonate co-crystallization consistent with a readily filterable product and/or crystal quality increases the TA recovery from a particular crystallizer feed stream.

Although good results are achieved by operation of a sodium carbonate decahydrate crystallizer under supersaturated conditions with respect to sodium bicarbonate with residence times for mother liquor throughput of three hours and more, preferred resident times are less than three hours with resident times of about one-half hour to about two hours giving the optimum levels of supersaturation and sodium carbonate decahydrate recovery. A residence time of about one hour is especially desirable.

EXAMPLE I

Several feed solutions of varying sodium carbonate and sodium bicarbonate contents and ratios were crystallized in a sodium carbonate decahydrate crystallizer at a crystallizer temperature of 5° C. and a crystallizer residence time of one hour in accordance with the processes of the present invention. The results of the crystallizations are summarized in Table II.

TABLE II

| Feed | | Mother Liquor | | Saturation | Degrees of Supersaturation | % of Feed Bicarbonate | |
|---|---|---|---|---|---|---|---|
| % Na$_2$CO$_3$ | % NaHCO$_3$ | % Na$_2$CO$_3$ | % NaHCO$_3$ | Temp (° C.) | (° C.) | Precipitated | Cake |
| 14.2 | 6.1 | 8.7 | 5.4 | 20.0 | 14.9 | 30 | Mush |
| 14.9 | 5.3 | 8.5 | 5.5 | 21.0 | 15.9 | 20 | Mush + Granular |
| 15.4 | 4.8 | 8.4 | 5.7 | 22.3 | 17.2 | 12 | Granular |

These data indicate several things: 1) that the carbonate and bicarbonate contents and ratios may affect the level of supersaturation attainable without significant co-crystallization of both decahydrate crystals and bicarbonate crystals; 2) that a certain level of co-crystallization can be attained without making the resulting crystalline product difficult to filter; 3) that lower levels of sodium carbonate, rather than being undesirable, are readily acceptable in a feed solution to a crystallizer operated in a supersaturated condition with respect to sodium bicarbonate, and 4) greater TA recovery can be achieved by providing some co-crystallization of sodium bicarbonate crystal products.

The data indicate that co-crystallization of sodium bicarbonate-containing crystals, whereby up to about 20% of the sodium bicarbonate present in the feed solution is precipitated, produces a substantially granular crystalline mass that may be filterable. Inasmuch as sodium carbonate decahydrate crystals are typically resolubilized in a further crystallization step, the presence of sodium bicarbonate crystals may not be a significant disadvantage so long as the crystalline mass may be readily separated from the supersaturated mother liquor by centrifugation or other conventional liquid-solids separation techniques.

A co-crystalline mass of sodium carbonate decahydrate and sodium bicarbonate is filterable with a sodium bicarbonate content of about 3 percent by weight on a wet basis for the co-crystalline mass. Preferably the sodium bicarbonate is maintained below about 3 percent by weight on a wet basis with improved filterability at levels of about 2 percent by weight on a wet basis and below. Best results of filtration of recovered crystalline solids occurs when the sodium bicarbonate is present in the wet filter cake at a level of about 1 percent or less by weight on a wet basis.

The filterability of a co-crystallized mass of crystals may be improved by the use of filter aids, crystal habit modifiers and like techniques.

The operation of the instant invention at ultra-supersaturation levels to produce acceptable co-crystalline masses does not distract from the unexpected aspect of the invention: that a decahydrate crystallizer may be operated in a continuous, dynamic manner with a mother liquor supersaturated with respect to sodium bicarbonate without co-crystallization of bicarbonate-type crystals.

EXAMPLE II

Initial tests relating to the instant invention were done with feed solutions having low insoluble carbonaceous matter, i.e., about 20 ppm. Typical feed solutions may often have carbonaceous insolubles much greater than 20 ppm. In order to test the effect of carbonaceous insolubles on the processes of the present invention, feed solutions having insolubles of about 400 ppm were run at supersaturated conditions without any significant effect, as illustrated by the following trial data in Table III:

TABLE III

| Feed | | Mother Liquor | | Saturation | Degrees of Super-saturation | % of Feed Bicarbonate | |
|---|---|---|---|---|---|---|---|
| % $Na_2CO_3$ | % $NaHCO_3$ | % $Na_2CO_3$ | % $NaHCO_3$ | Temp (° C.) | (° C.) | Precipitated | Cake |
| 14.4 | 4.6 | 8.1 | 5.6 | 22.8 | 17.8 | 1 | Granular |

In many of the tests conducted with respect to the invention, chloride and sulfate ions were present. At lower levels, e.g., up to about 1 percent Cl and up to about 1 percent $SO_4$, these ions were observed to have little effect upon equilibrium conditions. At higher levels these ions are known to depress equilibrium in sodium carbonate/sodium bicarbonate solutions. However, even at higher levels of chloride and/or sulfate contamination, such as that illustrated by the data in Table III, the invention may still be practiced at supersaturation levels of sodium bicarbonate although the degree of supersaturation attainable without precipitation of sodium bicarbonate may be lowered somewhat.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A method of crystallization of sodium carbonate decahydrate crystals from an aqueous solution containing sodium carbonate and sodium bicarbonate comprising conducting said crystallization under conditions which maintain said solution in a supersaturated condition with respect to dissolved sodium bicarbonate.

2. The method of claim 1, wherein said crystallization is conducted under dynamic conditions.

3. The method of claim 2, wherein crystallization is conducted under substantially continuous steady-state conditions.

4. The method of claim 1, wherein the solution is maintained at a degree of supersaturation wherein substantially no crystals of sodium bicarbonate crystallize with the crystals of sodium carbonate decahydrate.

5. The method of claim 1, wherein the solution is maintained at a degree of supersaturation wherein a controlled amount of crystals of sodium bicarbonate will crystallize with the crystals of sodium carbonate decahydrate.

6. The method of claim 4 or claim 5, wherein the residence times of the solution containing sodium carbonate and sodium bicarbonate in which the sodium bicarbonate is in a supersaturated condition is controlled within a crystallization zone to exclude or control the quantity of sodium bicarbonate crystals which crystallize with the crystals of sodium carbonate decahydrate.

7. The method of claim 1, wherein the solution is cooled to cause crystallization of sodium carbonate decahydrate crystals.

8. The method of claim 1, wherein water is evaporated from the solution to cause crystallization of sodium carbonate decahydrate crystals.

9. The method of claim 1, wherein said solution is formed by dissolving an ore containing sodium bicarbonate in an aqueous media.

10. The method of claim 9, wherein said ore is dissolved in situ by a solution mining process.

11. The method of claim 1, wherein said sodium carbonate decahydrate crystals contain essentially no sodium sesquicarbonate crystals.

12. The method of claim 1, wherein the crystallization of sodium carbonate decahydrate crystals is conducted under supersaturation conditions of from up to about 20 degrees Celsius of supersaturation.

13. The method of claim 1, wherein sodium bicarbonate content of the solution is above the solid line connecting points C–D in FIG. 1.

14. The method of claim 1, wherein the sodium carbonate content of the solution is up to about 29 percent.

15. In a method of producing sodium carbonate decahydrate crystals from an aqueous solution of sodium carbonate and sodium bicarbonate in a cooling-type decahydrate crystallizer, the improvement comprising maintaining the solution in a supersaturated condition with respect to sodium bicarbonate.

16. The method of claim 15, wherein the residence time of the solution is controlled within certain preselected times to produce essentially pure sodium carbonate decahydrate crystals containing essentially no sodium bicarbonate or sodium sesquicarbonate crystals.

17. The method of claim 15, wherein the decahydrate crystallizer is operated substantially continuously under dynamic, steady-state conditions.

18. The method of claim 15, wherein the solution is maintained at a preselected degree of supersaturation to avoid co-crystallization of sodium sesquicarbonate.

19. The method of claim 15, wherein the solution contains up to about 28 percent sodium carbonate.

20. In a method of producing sodium carbonate decahydrate crystals from an aqueous solution of sodium carbonate and sodium bicarbonate in an evaporative-type decahydrate crystallizer, the improvement comprising maintaining the solution in a supersaturated condition with respect to dissolved sodium bicarbonate.

* * * * *